F. BUCHANAN.
ELECTRODE FOR LUMINOUS ARC ELECTRIC LAMPS AND PROCESS OF MAKING THE SAME.
APPLICATION FILED JUNE 19, 1911.
1,258,984. Patented Mar. 12, 1918.
Fig-1-
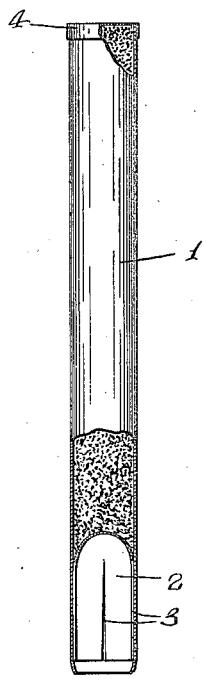
Fig-2-
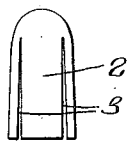
WITNESSES:
Chas H Young
S. Davis
INVENTOR
Frank Buchanan
BY
Parsons Hall & Bodell
ATTORNEYS

UNITED STATES PATENT OFFICE.

FRANK BUCHANAN, OF SYRACUSE, NEW YORK.

ELECTRODE FOR LUMINOUS-ARC ELECTRIC LAMPS AND PROCESS OF MAKING THE SAME.

1,258,984.  Specification of Letters Patent.  Patented Mar. 12, 1918.

Application filed June 19, 1911. Serial No. 634,019.

*To all whom it may concern:*

Be it known that I, FRANK BUCHANAN, of Syracuse, in the county of Onondaga and State of New York, have invented certain new and useful Electrodes for Luminous-Arc Electric Lamps and Processes of Making the Same, of which the following is a specification.

This invention has for its object the production of an electrode for luminous arm lamps, and it consists in the novel combinations of elements and the process or steps of combining said elements as hereinafter set forth and claimed.

In describing this invention reference is had to the accompanying drawing in which like characters designate corresponding parts in all the views.

Figure 1 is an elevation, partly in section, of one form of my electrode.

Fig. 2 is a detail view of the plug at the butt end of the electrode.

As is well known by those skilled in the art, metallic oxid electrodes for luminous arc lamps contain essentially, an iron oxid which gives conductively to the electrode and to the fused mass at the arcing end when cold, the other constituents of such electrodes not being satisfactory conductors.

In my electrode no iron oxid is used and a conductor of iron is used of sufficient substance or thickness to not only conduct the current but also unite with the other material of the electrode to make conductive the fused mass at the arc end, when cold, and by the use with such conductor of the filler hereinafter described, the arc is steady, dimming or dying down thereof at irregular intervals is eliminated, and the electrode is consumed slowly and evenly. I am unable to state what action takes place at the arc but have discovered that by the use of the ingredients as hereinafer set forth, an electrode of high efficiency is produced and a long sought for result obtained.

Preferably I employ titanic oxid or rutile and silica in some form, the rutile being powdered and mixed evenly in a solution containing silica, and the resultant moist mass dried and pulverized.

The agent containing the silica is usually silicate of soda or water glass; and the rutile is pulverized and preferably saturated with the water glass and the water of the moist mass is removed preferably by slow evaporation, and the dried mass pulverized. The resultant dry powder is then packed into the metallic conductor. Whether the powder is purely a mechanical mixture or to some extent the product of chemical action I am unable to state with certainty but am of the opinion that some chemical action takes place. Usually the powdered rutile and water glass are mixed in the proportion of twelve pounds of the former to about one quart of the latter, such mixture making a plastic mass from which the water is removed by evaporation.

If a less proportion of water glass or silica than twelve pounds of rutile to one quart of water glass, is used, I have found that the electrode gives a strong white light but consumes more rapidly than when the ingredients are mixed in said proportion, and if more than the foregoing proportion is used, so that there is an excess of silicate of soda, the arc is less luminous, and when the saturated mixture is used a very slow consuming electrode of highest efficiency is produced.

Usually the metallic conductor is a thin tubular iron shell about 25/1000 of an inch thick, and the dry powdered mixture of pulverized rutile and water glass is usually packed into such tube, and the butt end of the tube closed by a plug and the arc end thereof by a cap.

However, such mixture may be first molded into pencil form and then inserted in the tube.

In the drawing 1 designates the tubular metallic shell; 2 the plug at the butt end of the shell, this plug being preferably formed from a disk of sheet metal provided with radial slits 3, and forced into the butt end of the shell. 4 is the cap composed of the same metal as the shell and fitted tightly over the end of the same. After the cap has been burned through, the metallic shell and the mixture therein fuses at the arc end of the electrode.

I have found that an electrode constructed as described will give a practically steady, strong, white light and will last from one and one quarter to twice as long as other luminous arc electrodes operating under the same conditions, and will be more perfectly consumed so that less soot is deposited than with any other luminous arc electrode.

What I claim is:

1. An electrode for luminous arc electric lamps comprising a metal electric conducting shell, and a dry pulverized compound of rutile, and the unevaporative residue of water glass, intimately commingled, filled within the shell, such shell being of sufficient substance to carry the current to supply a conductive metal at the arc during the consumption of the electrode, and to render the fused end of the conductor conductive when cold, substantially as and for the purpose described.

2. An electrode for luminous arc electric lamps comprising an iron shell about twenty-five one-thousandths of an inch thick, and a filler within the shell, consisting of powdered rutile and the unevaporative residue of water glass, intimately commingled, said rutile and residue being intimately mixed in substantially the proportions of twelve pounds of rutile with the unevaporated residue of one quart of water glass, substantially as and for the purpose specified.

3. The herein described process of making electrodes for luminous arc lamps consisting in mixing pulverized rutile and water glass in substantially the proportions herein set forth, into a plastic mass, evaporating the water of the moist mass, pulverizing the dry product, and filling the same into a metallic tube, substantially as and for the purpose set forth.

4. A slow-consuming luminous arc light electrode comprising a metallic shell and a filler composed principally of rutile and sodium silicate, substantially as and for the purpose described.

5. A slow-consuming luminous arc light electrode comprising a metallic shell and a filler composed principally of rutile and residue of water-glass, substantially as and for the purpose specified.

6. A slow-consuming luminous arc light electrode comprising a metallic shell and a filler composed of intimately mixed and chemically uncombined rutile and sodium silicate, substantially as and for the purpose set forth.

In testimony whereof, I have hereunto signed my name in the presence of two attesting witnesses, at Syracuse, in the county of Onondaga, in the State of New York, this 31st day of May, 1911.

FRANK BUCHANAN.

Witnesses:
S. Davis,
Frederic G. Bodell.